United States Patent [19]
Linder et al.

[11] Patent Number: 6,086,764
[45] Date of Patent: Jul. 11, 2000

[54] SEMIPERMEABLE ENCAPSULATED MEMBRANES WITH IMPROVED ACID AND BASE STABILITY PROCESS FOR THEIR MANUFACTURE AND THEIR USE

[75] Inventors: Charles Linder, Rehovot; Mara Nemes, Neve Monoson; Reuven Ketraro, Rishon le Zion, all of Israel

[73] Assignee: Crosswinds, Inc., Wilmington, Mass.

[21] Appl. No.: 09/095,248

[22] Filed: Jun. 10, 1998

[30] Foreign Application Priority Data

Jun. 10, 1997 [IL] Israel ......................................... 121046

[51] Int. Cl.[7] .......................... B01D 39/00; B01D 39/14; B01D 71/00; B05D 1/38
[52] U.S. Cl. .............................. 210/500.21; 210/500.27; 210/500.34; 210/500.41; 210/506; 210/500.35; 210/500.37; 210/500.42; 427/244; 427/245; 427/341; 427/352; 427/353
[58] Field of Search ................................. 427/244, 372.2, 427/337, 340, 341, 342, 352, 353, 245; 210/500.27, 500.21, 500.34, 500.41, 506, 500.42, 500.35, 500.37

[56] References Cited

U.S. PATENT DOCUMENTS

| | | | |
|---|---|---|---|
| 4,360,434 | 11/1982 | Kawaguchi et al. | 210/500 |
| 4,618,533 | 10/1986 | Steuck | 427/245 |
| 4,659,474 | 4/1987 | Perry et al. | 210/638 |
| 4,690,766 | 9/1987 | Linder et al. | 210/654 |
| 4,767,645 | 8/1988 | Linder et al. | 427/386 |
| 4,778,596 | 10/1988 | Linder et al. | 210/638 |
| 4,839,203 | 6/1989 | Davis et al. | 427/244 |
| 5,024,765 | 6/1991 | Linder et al. | 210/651 |
| 5,039,421 | 8/1991 | Linder et al. | 210/651 |
| 5,348,652 | 9/1994 | Creusen et al. | 210/490 |
| 5,616,246 | 4/1997 | Gagnon et al. | 210/490 |
| 5,766,473 | 6/1998 | Strobel et al. | 210/490 |

FOREIGN PATENT DOCUMENTS

| | | |
|---|---|---|
| 0 114 286 | 12/1983 | European Pat. Off. . |
| 0 242 761 | 10/1987 | European Pat. Off. . |
| WO 91/18666 | 12/1991 | WIPO . |

*Primary Examiner*—Diana Dudash
*Attorney, Agent, or Firm*—Caesar, Rivise, Bernstein, Cohen & Pokotilow, Ltd.

[57] ABSTRACT

A process for the preparation of semipermeable membranes with improved acid and base stability including: (a) coating a base and acid stable ultrafiltration (UF) membrane support polymer, with a high molecular weight amphoteric polyelectrolyte coating polymer optionally in solution, the amphoteric polyelectrolyte containing both cationic and anionic groups and in addition primary and secondary amine groups, the solution optionally containing a latent internal crosslinker compound that is a polyfunctional compound that crosslinks the coating polymer only during a curing step at elevated temperatures and basic pH; (b) draining or washing the coated support; and (c) reacting the coating with a solution of an external crosslinking compound that is a polyfuntional compound, not overly reactive so as not to be hydrolyzed prematurely in solution, the time of exposure to the external crosslinking compound being sufficient to ensure its diffusion into the bulk of the coating, so that the crosslinking is effected not only on the solution-polymer coating interface, but throughout the bulk of the coating as well. The sequence (a)–(c) may optionally be repeated a number of times to give multiple crosslinked layers; draining or washing the coated UF support; and curing the coated membrane by heating at an elevated temperature and basic pH to complete crosslinking by the external crosslinking molecule and if present, also effect crosslinking by the latent internal crosslinker, that is primarily activated only at the elevated temperature conditions.

40 Claims, No Drawings

6,086,764

SEMIPERMEABLE ENCAPSULATED MEMBRANES WITH IMPROVED ACID AND BASE STABILITY PROCESS FOR THEIR MANUFACTURE AND THEIR USE

FIELD OF THE INVENTION

The present invention relates to a process for the preparation of semipermeable membranes with improved acid and base stability and high effective performance lifetime in selective separation processes. The invention specifically relates to a process by which one can prepare selective semipermeable membranes for separation processes that facilitate for example, raw material recovery, product recovery and environmental quality control and enhancement.

BACKGROUND OF THE INVENTION

U.S. Pat. No. 4,778,596 provides semipermeable membranes of a porous polymeric substrate whose external and all internal surfaces (pores) are encapsulated by a semipermeable thin film of a hydrophilic polymer. The encapsulating film consists of at least one layer of said hydrophilic polymer which is cross-linked/stabilized by polyfunctional compounds containing at least two functional (reactive) groups. Such membranes show improved separation behavior as well as enhanced performance lifetime at relatively high and low pH, temperature and pressure. The pH range within which it is possible to use such membranes effectively, was described as being from 2 to 12.

Because many common and important processes involve process, product and waste stream involving greater extremes of pH, the advantages of providing a process by which membranes that can operate effectively in the pH range from 0 to 14, are self evident.

SUMMARY OF THE INVENTION

It is an object of certain aspects of the present invention to produce semipermeable membranes with enhanced performance lifetime, separation selectivity and separation rates even under extreme conditions of pH, i.e., more alkaline than pH 12 and more acidic than pH 2. This object is achieved by selecting reaction conditions for the crosslinking of an amine containing hydrophilic polymer with a polyfunctional compound to form a base and acid stable crosslinked structure.

There is thus provided, in accordance with preferred embodiments of the present invention a process for forming semipermeable membranes with enhanced acid and base stability, comprising:

(a) coating a base and acid stable ultrafiltration (UF) membrane support polymer, with an amine containing amphoteric polyelectrolyte coating polymer optionally in solution, said amphoteric polyelectrolyte containing both cationic and anionic groups and in addition primary and secondary amine groups, said solution optionally containing a latent internal crosslinker compound that is a polyfunctional compound that crosslinks the coating polymer only after the coating and draining/washing steps, during a curing step at elevated temperatures and basic pH;

(b) draining or washing the coated support;

(c) reacting the coating with a solution of an external crosslinking compound that is a polyfunctional compound that is sufficiently reactive to bind to the coating polymer under conditions of application, but not overly reactive so as not to be hydrolyzed prematurely in solution, the time of exposure to the external crosslinking compound being sufficient to ensure its diffusion into the bulk of the coating, so that the crosslinking is effected not only on the solution-polymer coating interface, but throughout the bulk of the coating as well.

The sequence (a)–(c) may optionally be repeated a number of times to give multiple crosslinked layers;

(d) draining or washing the coated UF support; and (e) curing the coated membrane by heating at an elevated temperature and basic pH to complete crosslinking, by the external crosslinking molecule and if present, also effect crosslinking by the latent internal crosslinker, that is activated only at the elevated temperature conditions.

DETAILED DESCRIPTION OF THE INVENTION

The present invention will be more clearly understood from the following detailed description of certain preferred embodiments thereof, in conjunction with the various examples included herein.

Semipermeable encapsulated membranes, processes for their manufacture and their use are described in U.S. Pat. No. 4,778,596 the disclosure of which is incorporated herein, by reference. According to the disclosure of U.S. Pat. No. 4,778,596, the membranes obtained thereby show improved separation efficiency in the pH range from 2 to 12. The present invention involves a process for producing improved semipermeable encapsulated membranes, that exhibit enhanced performance at pH as high as 14 and as low as 0. This is achieved by using crosslinkers which give acid and base stable crosslinks.

Two process schemes, "A" and "B", that illustrate the concept of the present invention, are presented below:

Process Scheme "A"

a. Coating an ultrafiltration (UF) support made from polyethersulfone or polysulfone, or some other base stable UF support with an amphoteric polyelectrolyte (i.e., containing both cationic and anionic groups), that also has reactive primary and secondary amine groups, b. draining or washing, c. reacting the coating with a solution containing a crosslinker, such as cyanuric chloride, d. draining or washing, e. curing step: Heating at elevated temperature under basic conditions, to fully crosslink the coating membrane thus formed.

The cyanuric chloride crosslinker applied to the coating, is called an external crosslinker. It is essential that the time of exposure to the cyanuric chloride crosslinker solution is sufficient for the cyanuric chloride to diffuse into the bulk of the coating, and the crosslinking reaction takes place not only on the interface of the coating, but throughout its bulk as well.

Process Scheme "B"

a. Coating an ultrafiltration (UF) support made from polyethersulfone or polysulfone, or some other base stable UF support with a solution of amphoteric polyelectrolyte (i.e., containing both cationic and anionic groups), that also has reactive primary and secondary amine groups, and that also contains a latent crosslinker (i.e., a latent internal crosslinker). The latent crosslinker is a multifunctional reactive molecule that does not react to crosslink the polymer in the coating solution under the conditions of coating or during subsequent steps, until the curing step, b. draining or washing, c. reacting the coating with a solution containing a crosslinker, such as cyanuric chloride, d. draining or washing, e. curing step: Heating at elevated temperature under basic conditions, to fully crosslink the coating membrane thus formed, through both the externally applied cyanuric chloride (external crosslinker) and the latent crosslinker (internal crosslinker) which is activated under these curing conditions.

Here too the time of exposure to the cyanuric chloride crosslinker solution should preferably be sufficient for the cyanuric chloride to diffuse into the bulk of the coating, so that the crosslinking reaction takes place not only on the interface of the coating, but throughout its bulk as well.

Points relevant to both Process Schemes "A" and "B"

In U.S. Pat. No. 4,778,596, the specification states that the membranes of the patent may only be used within the pH range of 2 to 12. It is therefore indeed surprising that the membranes produced by the above described process schemes may be used in basic solutions at pH's of 14 and higher and acid solutions of pH's of 0 and less, at temperature up to 80 degrees C.

The process schemes so described thus provide a convenient means for making acid/base stable nanofiltration (NF) membranes. These NF membranes may have different molecular weight cutoffs (MWCO). The NF range is generally defined as membranes having rejections greater than 90% to molecules in the range between 100 to 1500. The preferred cutoffs for individual membranes are 150, 200, 250, 300, 400 up to 1000. For example, one preferred NF membrane has a 90+% rejection to 1% glucose, and less than 50% rejection to 2% sodium chloride, or more preferred, less than 20% rejection to the salt. Another preferred membrane will have a 90+% rejection to 1% sucrose, and less than 50% rejection to 2% sodium chloride. the rejection to polyethylene glycol 1000 is 90+5 and the rejection to 1% sodium chloride is less than 20%. The NF membrane chosen depends on the application.

In the application of the acid/base stable membranes of the present invention, the important uses are in caustic and acid recovery from process streams generated in "cleaning in place" (CIP) processes and general cleaning processes in the food, beverage and bottle washing industries, mercerization of textiles, ion exchange regeneration in orange juice and sugar clarification, polyvinylpyrrolidone particle (PVPP) regeneration in beer clarification, cellulose production, cotton mercerization, aluminum parts etching and washing, washing bottles with aluminum labels, battery manufacturing, aluminum mining and iron pickling. The application of the inventive membranes, are not limited to this list.

In these applications, the membranes should have a molecular weight cut off (MWCO) of less than 1000, preferably less than 600, and most preferably less than 400. In some cases, the molecular weight cut-off (MWCO) should be between 100 and 200. Typical operating conditions are 1 to 5% caustic at up to 80 degrees C., or 5 to 20% caustic at up to 80 degrees C., and 1 to 5% nitric acid up to 60 degrees C. Typical rejections may be 90+% to molecules with molecular weight (MW) equal or greater than sucrose, in caustic, 85+% to aluminates in caustic, 90+% to COD in caustic and acid, 90+% rejection to calcium salts in nitric acid.

While many polymeric supports are cited in U.S. Pat. No. 4,778,596, the UF supports of this invention, must have acid and base stability, are asymmetric, and have a molecular weight cutoff between 10,000 to 80,000, preferably between 20,000 to 30,000. These supports may be made preferably from polysulfone, polyethersulfone, polyarylsulfone, and other materials such as polyetherketones, polyetherether ketones, polyphenylene sulfides, polyphenylene oxides, polyolefins polystyrene and its co and tri polymers, polytetrafluoroethylenes and others. While many hydrophilic coating polymers are mentioned in the said patent, for the present invention, only certain polymers give the selectivity and acid/base stability required. These are the acid/base stable coating polymers which are water soluble amphoteric polymers containing anionic groups, cationic groups and reactive amino groups through which the crosslinkers can crosslink the coating. The ionic groups may be sulfonic, carboxylic, phosphonium, primary, secondary, tertiary and quaternary ammonium groups. The quantity of anionic groups can vary between 0.1 to 4.0 meq/gram of polymer, but most preferably, between 0.8 and 2.0 meq/gram. The quantity of amino groups may vary between 1 to 20 meq/gram. Preferably, it is more than 10 meq/gram.

The molecular weight of the polyamphoteric polymers used in the coating, should be at least 10,000 and preferably in the range of 20,000 to 60,000. Examples of such amphoteric polymers are:

a. vinyl amine/vinyl sulfonate b. vinyl aniline/styrene sulfonic acid c. vinyl amine/styrene sulfonic acid d. vinyl amine or vinyl aniline/vinyl sulfonate or methacrylic or acrylic polymers e. polyamine derivatives formed by the reaction of some of the amine groups with a compound that contains a functional group that reacts with the amine group to form a bond and at least one other functional group that is anionic. Preferred polyamines for derivatization in this manner include, polyethyleneimines, polyallylamine, polyvinylamine, polypiperidines and polydiallylamines. The extent of the reaction should place a given amount of the charged groups on the polymer, to the extent indicated before in the preferred meq/gram for such polymers. Sufficient unreacted amine groups should remain to provide sufficient cationic character to the polymer as well as to react with internal and external crosslinkers. The process of derivatizing the polymer must not crosslink the polymer, which must remain water soluble at this point.

Compounds that can be used to derivatize the amine containing polymers, to form amphoteric polymers, must form acid/base stable bonds and have stable acid/base bonds to the ionic groups they contain. In general, the reactive groups in these compounds may be chosen from the list of groups described in U.S. Pat. No. 4,778,596 for the crosslinkers, with the provision that the resultant bond formed between the reactive groups and the amino groups in the polyamines has acid and base stability. Such derivatizing agents may have a leaving group which is replaced by a nitrogen group of the polyamine. Such groups may be halides such as F, Cl, Br, and I, where Cl and I are preferred. Other leaving groups are quaternary ammonium, pyridinium, and sulfonium. There may be only one leaving group, as more than one will cause crosslinking. The reagent also contains carboxylic acid, sulfonic, or phosphonic groups. There may be at least, 1 but also 2 or 3 such ionic groups on each reagent molecule. The anionic group may be directly attached to an aliphatic group or there may be a bridging aromatic or benzyl. The aromatic group is preferably a phenyl group but it may also be a naphthyl group. The aromatic or benzyl groups may contain other groups but these groups must not interfere with the binding reaction, or cause the resulting polymer to be non-water soluble, and should not interfere with the final crosslinking reaction of the coating. In the case of diazines or triazines, one, two or three ionic may be found bound to the triazine group through alkyl or aromatic bridges. In all cases, however, the bond to the triazine or diazine moiety should be through a nitrogen or direct carbon bond. This is necessary to ensure bond stability in acid bases.

Thus the organic moiety of the reagent may be an alkyl group branched or straight chained containing 2 to 8 carbon atoms, benzyl, diazine, triazine quinoxaline, or quinazoline. If it contains groups other than leaving or ionic groups, then these groups must not interfere with the binding reaction, or cause the resulting polymer to be non-water soluble and should not interfere with the final crosslinking reaction of the coating. Some preferred examples are:

1. bromo or chloro acetic acid
2. bromo or chloro propanoic acid
3. bromo or chloro ethane sulfonic acid
4. 2 chloro 4,6 di 4-sulfonic anilino triazine
5. 2 chloro 4,6 di 2 sulfonic ethylamino triazine
6. chloro or bromomethyl benzoic acid
7. chloro or bromomethyl benzene sulfonic acid The internal crosslinkers should have each of the following characteristics:

1) At least two functional groups to crosslink the polymer under condition of curing, but should not crosslink when in the coating solution or at any time before the elevated temperature curing step.
2) One of the at least two functional groups which participate in the crosslinker may react to bind to the polymer, but the second group must not react before the curing step. In other words, the crosslinkers may have step reactivity.
3) The internal crosslinkers should preferably be water soluble and upon reacting with the polymer, form a water soluble amphoteric polymer derivative. Crosslinkers with low water solubility may also be used, if they form a water soluble amphoteric polymer derivation. This approach is less preferred.
4) The internal crosslinker should only crosslink the polymer in the curing step, after the application of the external crosslinker.
5) The crosslinking bonds of the internal crosslinker should be stable in acid and base.

In general, the reactive groups for the crosslinkers and the latent compounds themselves may be chosen from the list of groups and compounds described in U.S. Pat. No. 4,778,596 for the crosslinkers (columns 9 to 14), with the provision that they meet the above 5 criteria for the latent crosslinker. In general, the general category of crosslinkers contain organic moieties, such as, alkyl alkylaromatic, diazines, triazines, and may also contain an ionic group directly attached to the alkyl, or to an aromatic bridging group.

In the case of the triazine and diazine compounds the ionic groups are attached to an alkyl or aromatic moiety and this is bound to the diazine or triazine through a nitrogen bond or carbon-carbon bond. There may be other functional groups which must not interfere with the binding reaction, or cause the resulting polymer to be non-water soluble and should not interfere with the final crosslinking reaction of the coating, and the number of ionic groups may be one, two or three.

The reactive group on the latent crosslinker, is readily displaced by the amino groups of the polyampholyte forming a carbon nitrogen bond, under conditions of the final curing step of elevated temperature and pH. Such leaving groups are halides such as F, Cl, Br, and I, where Cl and I are preferred. Other leaving groups are quaternary ammonium, pyridinium, and sulfonium. There should be at least two leaving groups on each crosslinker.

Examples of such crosslinkers are:

Dihalo triazines, di or trihalodiazines, di or trialoalkylcarboxylic or di or trihaloalkysulfonic compounds. In addition, crosslinkers containing double bonds, where the amine adds by a Michael addition, may also be used. Specifically:

a. dibromo or dichloro acetic acid
b. dibromo or dichloro propanoic acid
c. dibromo or dichloro ethane sulfonic acid
d. dibromo or dichloro propane sulfonic acid
e. 2,4 dichloro-6-(sulfonic anilino) triazine
f. 2,4 dichloro-6-(2-sulfonic ethylamino) triazine
g. 2,4,5,6, tetrachloro pyrimidine
h. 2,4,6 trichloro pyrimidine
i. diallyloxyacetic acid The External Crosslinker In general, the external crosslinkers may be chosen from the list of compounds described in U.S. Pat. No. 4,778,596 for the crosslinkers, with the provision that they crosslink the layer according to the provisions that follow, and form base and acid stable crosslinks. Since this crosslinker must also penetrate through the coating to also crosslink to some extent the bulk of the coating, and since the coating contains water, the crosslink should not hydrolyze excessively in water, like acyl chlorides. Without the correct combination of stability, reactivity and solubility to achieve penetration through the coating, selective and stable NF membranes are not achieved after the curing step. The most preferred crosslinker in this case is cyanuric chloride (2,4,6-trichloro-s-triazine).

Process details:

Application of the coating polymer to the support and rinsing or washing steps after the application is also described in U.S. Pat. No. 4,778,596. The polymer concentration in the coating solution should be at least 1.0%, and not more than 20%. Preferably, the concentration should be between 2.0 to 6.0%.

The concentration of the latent crosslinker is in the range of 0.01% to 5% with the most preferred range between 0.02% to 1%. If the process requires a water rinsing step after the polymeric coating step, then the internal crosslinker must be chosen so that one of the groups reacts with the polymer so that it is not washed out in the washing step. Thus, the latent crosslinker for all processes which contain a washing step after the coating require a latent internal crosslinker of step reactivity. In effect, one group reacts with the amines of the coating polymer under the conditions of coating, and the second group reacts in the final curing step. Examples of such crosslinkers are ionic derivatives of trichloropyrimidine, dichloro triazine derivatives, and dichloro propanoic acid One preferred solvent for the crosslinker (external) is water. But other solvents (polar, aprotic and hydrophobic) may be used, if they do not damage or swell the underlying supports.

The Curing Step

If the heat curing is done in an aqueous solution, than the temperature is between 40° C. to 100° C., In the dry state, the membrane can be cured at higher temperatures without going, so high as to damage the support. In the curing, step it is important to maintain the pH of the membrane in the basic pH range to get the desired stability. This is because the crosslinking occurs between amino groups and the reagent. In the water solutions, this should be between pH 8.0 to 12, and preferably between pH 8.5 to 10. The exact pH has to be determined by experimentation, but it should not be so high as to hydrolyse the reagent or so low that the amine groups are protonated. Curing in the dry state, the membrane's pH may be adjusted if needed, for example by an exposure to a solution of the desired pH, prior to the curing step. One of the important aspects of the present invention is the use of a curing step at elevated temperatures in basic pH's as described above, in conjunction with the cyanuric crosslinker. This gives the superior stability over the membranes produced by U.S. Pat. No. 4,778,596.

The steps of membrane manufacturing (coating, draining or washing, curing, etc.) may be carried out in a batch mode or continuously. The time for the individual steps may be optimized to achieve relatively short, continuous processes.

The separation effect (the rejection) of the membranes can be measured as follows: a circular membrane with a surface area of 17 cm$^2$, resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to pressure of 15–30 bars. The liquid is stirred magnetically. The liquid which collects on the outlet side of the membrane is examined to determine its content (concentration) $c_2$ of the substance to be tested, 3 samples of 5 ml each being taken from the start of the experiment. In general, the amount which flows through the membrane and the composition of the 3 samples are constant. The rejection can be calculated from the values obtained. Using the equation:

$$R = \frac{C_1 - C_2}{C_1} \cdot 100\%$$

The amount of the material passed through the membrane per surface and time unit is found to be:

$$F = V \cdot S^{-1} \cdot t^{-1}$$

V: volume
S: membrane surface area
t: time

F is approximately expressed in m$^3 \cdot$m$^{-2} \cdot$d$^{-1}$, i.e. the number of cubic meters per square meter surface area of the membranes and per day, or in 1·m$^{-2}$d$^{-1}$ i.e. liters per square meter surface area of the membrane per day.

In addition to the measurements on flat membranes, measurements on tubular membranes 60 cm long and with an outer diameter of 1.4 cm are also carried out. For this purpose, these tubular membranes are placed in a perforated tube made of Stainless steel.

The whole is placed in a tube made of stainless steel. The outflow from the membrane is between this outer stainless steel tube and the perforated steel tube. The liquid is added as a stream of the solution is turbulent or laminar flow, under pressure (30 bars). The flow rate is kept constant at 10–15 liters per minute. The rejection (R) and the flux (F) are calculated in the same way as for the membranes.

EXAMPLES

Example 1

A clean tubular polysulfone (Udel 3500 polymer) ultrafiltration support (nominal molecular weight cutoff 20,000) on polypropylene nonwoven is modified by immersion in a 10% solution of poly(vinylaminevinylsulfonate sodium salt) for 10 minutes, rinsing 15 minutes, immersion in a 2% aqueous cyanuric chloride pH 9.0–5 minutes, rinsing 15 minutes and repeating the sequence of polymer, cyanuric chloride, rinsing a second time. Samples of the same membrane are now stored overnight under different conditions:

a) overnight room temperature pH 7.0
b) overnight room temperature pH 10.
c) overnight 60° C. temperature pH 10

After overnight curing, the membranes were placed in 30% sulfuric acid/60° C. for improving flux.

All membranes were then operated in a pilot at 15 atm, 10–15 liters/min flow rate with 2% caustic at 70° C. To test the stability of the membrane under these conditions, periodic tests were carried out with 5% sucrose in 2% caustic. All membranes had an initial sucrose rejection above 95+% and fluxes greater than 1000 liters/meter$^2$/day. Membranes made by "a" and "b" conditions above saw a drop in the sucrose rejection below 90%, before 100 hours.

The membrane made by condition "c" maintain 90+% for more than 3000 hrs.

This example shows the importance of the curing step at elevated temperature and pH, to achieve chemical stability.

Example 2

The membrane of example 1 is repeated, with the difference that a polyethyleneimine (molecular weight 30,000) derivative is used, instead of a polyvinyl amine poly vinyl sulfonic acid copolymer. The concentration of the polyethyleneimine derivative is 2% instead of 10%. The polyethyleneimine derivative is made by reacting the polyethyleneimine with 6-chloro-bis 2,4(4-sulfonic amino acid) triazine to bind 1.2 meq sulfonic groups/gr. polymer. Membranes were then cured according to procedures "a", "b" and "c" of example 1.

All membranes had starting performance of 95+% rejection to sucrose and fluxes above 1000 1/m$^2$d. As in example 1 above, membranes cured at pH 10, 60° C. overnight and operated in 2% caustic at 70° C., had 90+% sucrose rejection after 5000 hrs. Membranes made with curing at room temperature as in "a" and "b", had a sucrose rejection of less than 90% after 100 hrs.

Membranes made by example 2 were also tested for stability in nitric acid. Membranes were immersed in 10% nitric at 80° C. for 48 hours and then checked for sucrose rejection. Membranes made with a curing step at room temperature ("a" & "b") had a sucrose rejection of less than 60%. Membranes made with the elevated temperature curing step had a 95+% rejection to sucrose. This example shows oxidant acid and base stability.

Comparative Example A

If example 2 is repeated going through the sequence for polymeric coating, washing cyanuric chloride once, instead of twice, and all other procedures exactly the same way, the resultant membrane still has a starting rejection of 95+% to sucrose. If this procedure is repeated to make a membrane but using underivatized polyethyleneimine then the rejection to sucrose is less than 85%. This comparative example shows the importance of using amphoteric polymer to get high selectivity.

Comparative Example B

If examples 1 or 2 above are repeated using a crosslinker other than cyanuric chloride, for example a dianhydride, or diepoxy or dialdehyde and checked for acid base stability, it is found that these membranes do not have good acid and base stability as the membranes made from cyanuric chloride.

Example 3

Example 2 is repeated using however, a polyethyleneimine (PEI) derivative with a 6 chloro, bis 2,4(4-carboxyl anilino acid) triazine instead of 6 chloro, bis 2,4(4-sulfonic anilino acid) triazine. The results are similar as in example 2 above. This example shows the results of using different derivatives.

Example 4

Example 2 is repeated using, however, a polyethyleneimine (PEI) derivative base on reacting the PEI with bromoethane sulfonic acid. The results are similar as in example 2 above. This example shows the results of using different derivatives.

Example 5

Example 2 and 4 are repeated using derivatives of polyallylamine, MW 60,000, instead of PEI. The results are similar.

Example 6

Example 2 is repeated with the addition that 0.02% of a latent crosslinker is added to the PEI coating solution. This latent crosslinker is 2,4,6 trichloropyrimidine. The membranes made by these approach and by example 2, where in both cases there was an overnight curing at 60° C., pH 10, were both subjected to an accelerated stability test. The test was carried out at 80° C. In 5% caustic for 500 hrs. The sucrose rejection of the membranes without the latent crosslinker in the coating solution dropped from an initial 95% to below 85%, while membrane with the latent crosslinker maintained its sucrose rejection above 95%.

This example shows how latent crosslinkers can improve the base stability of the membranes still further.

This latent crosslinker has a low water solubility and its solution with the amphoteric polymer has a short lifetime. It is thus not as much preferred as the other crosslinkers which are water soluble.

Example 7

Example 6 is repeated using as the latent crosslinker 0.2% 2,3-dibromopropanoic acid with similar results.

Example 8

Example 2 was repeated with the difference that a flat UF support made of polyethersulfone on polypropylene nonwoven was used instead of the tubular polysulfones. The results were similar as in example 2. This example shows that different configurations and polymers can be used.

Example 9

The stabilized membrane of example 2 was employed to purify caustic from CIP waste streams in the dairy, beverage and bottle washing industries. In these applications the membrane removed most of the COD impurities such that the caustic could be used again. The membranes lifetime in these applications was more than 5000 hrs.

Example 10

Example 9 is repeated but this time using the membrane to recover caustic from a process where the waste caustic comes from the regeneration of PVPP in the beer industry of fruit juice industry. The membranes showed similar results as in example 9.

Example 11

The stabilized membranes of example 2 was employed to purify Nitric acid streams from CIP waste streams in the dairy industries. In these applications, the membrane removed most of the COD impurities and calcium salts such that the Nitric acid could be used again. The membrane's lifetime in these applications was more than 3000 hrs and the rejection to calcium salts remained above 90%.

Example 12

The stabilized membrane of example 2 was employed as a prefilter to an reverse osmosis membrane in an application to treat or recover water from industrial waste streams with constant stable performance for more than one year. These waste streams contain many foulants which would rapidly degrade the performance of the reverse osmosis membranes. The commercially available reverse osmosis membranes cannot be effectively cleaned of these foulants because the required conditions of cleaning the foulants would destroy the membrane. As a prefilter, the invented membranes could remove all the foulants that would foul the reverse osmosis membrane, and because of its acid base stability, it can be cleaned of the foulants without loss of performance.

It will be appreciated by persons skilled in the art that the present invention is not limited by the description and example provided hereinabove. Rather, the scope of this invention is defined by the claims which follow:

What we claim is:

1. A process for the preparation of semipermeable membranes comprising the steps of:
   (a) coating a base and acid stable ultrafiltration (UF) membrane support polymer, with an amphoteric polyelectrolyte coating polymer of molecular weight at least about 10,000, whereby to form a coated support having a first layer of coating;
   (b) removing excess amphoteric polyelectrolyte coating polymer from said coated support by an action selected from the group of draining said coated support and washing said coated support;
   (c) contacting said first layer of coating with a solution of an external crosslinking compound that is a polyfunctional compound;
   (d) removing excess solution containing said external crosslinking compound by an action selected from the group consisting of draining said coated support and washing said coated support; and
   (e) curing said first layer of coating by heating the coated UF support at an elevated temperature and basic pH, whereby to enable completion of crosslinking by said external crosslinking compound.

2. A process according to claim 1 wherein said external crosslinker is in aqueous solution.

3. A process as in claim 1 wherein the membrane support is of asymmetric structure and comprises polymeric materials selected from polysulfones, polyethersulfones, polyarylsulfones, polyetherketones, polyetherether ketones, polyphenylene sulfides, polyaryleneoxides, polyolefins, polystyrene and its co and terpolymers.

4. A process as in claim 1 wherein the membrane support structure comprises polymeric materials selected from polysulfones, polyethersulfones and polyarylsulfones.

5. A process as in claim 1 wherein the membrane support structure comprises polymeric materials having a molecular weight cut off between about 10,000 to about 80,000.

6. A process as in claim 1 wherein the amphoteric polyelectrolyte coating polymer is acid and base stable, water soluble, containing anionic and cationic groups and reactive amino groups through which crosslinkers may crosslink the coating.

7. A process as in claim 6 wherein the ionic groups are sulfonic, carboxylic, phosphonium, primary, secondary and tertiary ammonium groups.

8. A process as in claim 6 wherein the quantity of anionic groups is between 0.1 to 4.0 meq/gram of polymer.

9. A process as in claim 6 wherein the quantity of anionic groups is between 0.8 to 2.0 meq/gram of polymer.

10. A process as in claim 6 wherein the quantity of amino groups is between 1 to 20 meq/gram of coating/polymer.

11. A process as in claim 6 wherein the quantity of amino groups is more than 10 meq/gram of coating polymer.

12. A process as in claim 1 wherein the membrane support structure comprises polymeric materials having a molecular weight cut off between about 20,000 to about 30,000.

13. A process as in claim 1 wherein the molecular weight of the amphoteric polyelectrolyte coating polymer is in the range of about 20,000 to about 60,000.

14. A process as in claim 1 wherein the amphoteric polyelectrolyte coating polymer is selected from at least one the group of copolymers consisting of:
vinylamine-vinylsulfonate,
vinylaniline-styrene sulfonic acid,
vinylamine-styrenesulfonic acid,
vinylamine-methacrylate,
vinylamine-acrylate,
vinylaniline-vinylsulfonate,
vinylaniline-methacrylate,
vinylaniline-acrylate,
and copolymers consisting of polyamines which have been reacted with a compound having at least one first functionality that reacts with an amine site on the polyamine to form a bond which is stable at pH's above 12 and below 2, said compound having at least one first functionality having, in addition, at least one second functionality that is an anionic group, said anionic group functionality being bonded to said compound by a bond which is stable at pH's above 12 and below 2.

15. A process as in claim 1 wherein the amphoteric polyelectrolyte coating polymer is a reacted polyamine with active hydrogen atoms bonded to nitrogen and wherein the polyamine nitrogen atoms are present as components of amino groups selected from the group consisting of primary amino groups, secondary amino groups, tertiary amino groups, acyclic aliphatic amino groups, cyclic aliphatic amino groups, aromatic amino groups and heterocyclic amino groups.

16. A process as in claim 15 wherein the polyamine is at least one member of the group consisting of polyethyleneimines, polyallylamines polyvinylamines, polydiallylamines and polypiperidines.

17. A process as in claim 14 wherein, in said compound having at least one first functionality:

(i) the at least one first functionality that reacts to form a bond with an amine site on the polyamine is a single leaving group which is replaced by the nitrogen atom of said amine site when the compound reacts to form said bond;

(ii) said anionic group is selected from carboxylic acid, sulfonic acid and phosphonic acid; and (iii) both said leaving group and said anionic group are covalently bonded to R, where R is selected from the group consisting of a branched alkyl group containing 2 to 8 carbon atoms, a straight chain alkyl group containing 2 to 8 carbon atoms, benzyl, diazine, triazine, quinoxaline and quinazoline;

with the proviso that when R is an alkyl group, the anionic group may be directly attached to R or may be attached through a bridging aromatic or benzyl group, with the further proviso that R or aromatic groups connected to R may have additional substituents other than the leaving and anionic groups, provided that said additional substituents do not cause the resulting polymer to be non-water soluble.

18. A process as in claim 14 wherein said compound having at least one first functionality is selected from the group consisting of bromoacetic acid, chloroacetic acid, bromopropionic acid, chloropropionic acid, bromoethanesulfonic acid, chloroetanesulfonic acid, 2-chloro-4,6-di-4-sulfonic anilino triazine, 2-chloro-4,6-di-2-sulfonic ethylamino triazine, chloromethyl benzoic acid, bromomethyl benzoic acid, chloromethyl benzene sulfonic acid, and bromomethyl benzene sulfonic acid.

19. A process according to claim 1, wherein said amphoteric polyectrolyte coating polymer of step (a) is present in solution.

20. A process according to claim 19, wherein said solution containing said amphoteric polyelectrolyte coating polymer further comprises a latent internal crosslinker compound that is a polyfunctional compound that may partially crosslink said amphoteric polyelectrolye coating polymer prior to step (e) but which completely crosslinks said amphoteric polyelectrolyte coating polymer only during step (e).

21. A process as in claim 20 wherein said internal latent crosslinker compound has at least two bond-forming functional groups which form bonds which are stable at pH's above 12 and below 2, wherein all of said bond-forming functional groups react with the amphoteric polyelectrolyte coating polymer only during step (e), and wherein said internal latent crosslinker compound is water soluble.

22. A process as in claim 21 wherein the internal crosslinker compound is selected from the group comprising alkyl compounds, alkylaromatic compounds, alkylcarboxylic compounds, alkylsulfonic compounds, divinyl compound, diallyl compound, diazines and triazines, wherein the internal crosslinker compound may contain up to three anionic groups, with the proviso that if the internal crosslinker compound is an alkyl compound, said ionic groups are attached directly to the alkyl or via an aromatic bridging group, with the further proviso that if the internal crosslinker compound is a diazine or a triazine, said ionic groups are attached to an alkyl or aryl moiety that is bound to the diazine or triazine through a nitrogen or carbon-carbon bond;

and wherein said internal crosslinker compound further has a reactive group which may be displaced by the amino groups of the amphoteric polyelectrolyte coating polymer to form a carbon-nitrogen bond.

23. A process as in claim 22 wherein the internal crosslinker compound is selected from the group comprising dihalotriazines, dihalodiazines, trihalodiazines, dihaloalkylcarboxylic compounds, trihaloalkylcarboxylic compounds, dihaloalkylsulfoninc compounds, trihaloalkylsulfonic compounds, divinyl compounds and diallyl compounds.

24. A process according to claim 20, where the internal crosslinker compound is a divinyl or diallyl compound that reacts with amines via the Michael addition mechanism.

25. A process as in claim 22 wherein the internal crosslinker compound is selected from the group consisting of dibromo acetic acid, dichloroacetic acid, dibromopropionic acid, dichloropropionic acid, dibromo ethanesulfonic acid, dichloro ethanesulfonic acid, dibromo propane sulfonic acid, dichloro propane sulfonic acid, 2,4-dichloro-6-(4-sulfonic anilino) triazine, 2,4-dichloro-6-(2-sulfonic ethylamino) triazine and diallyloxyacetic acid.

26. A process as in claim 1 wherein the polyfunctional compounds contain at least two functional groups selected from the group consisting of multiple unsaturated bonds, and cyclic carbonic acid imide halide moieties.

27. A process as in claim 21 wherein the polyfunctional compounds are ionic and selected from the group consisting of cyclic carbonic acid imide halides.

28. A process as in claim 21 wherein the polyfunctional compounds are ionic polyfunctional compounds selected from the group consisting of halogenodiazines and triazines containing at least two functional substituents.

29. A process as in claim 1 wherein the external crosslinking compound is 2,4,6-trichloro-s-triazine.

30. A process as in claim 20 wherein the internal latent crosslinker compound concentration is between 0.01–5.0 wt. %.

31. A process as in claim 20 wherein the internal latent crosslinker compound concentration is between 0.02–1.0 wt. %.

32. A process as in claim 1 wherein the curing is carried out in the aqueous phase at a temperature between 60 to 100 degrees centigrade, and pH between about 8.0 and about 12.

33. A semipermeable membrane produced in accordance with claim 1.

34. A process as in claim 1 where all the steps are done continuously.

35. A process as in claim 20, wherein said internal latent crosslinker compound has at least two bond-forming functional groups which form bonds which are stable at pH's above 12 and below 2, wherein one of said bond-forming functional groups reacts with the amphoteric polyelectrolyte coating polymer only prior to step (e), and wherein the product of the reaction between said internal latent crosslinker compound and amphoteric polyelectroylte coating polymer which occurs prior to step (e) is a water soluble and amphoteric product.

36. A process according to claim 22 wherein said internal crosslinking compound comprising at least two said reactive groups which may be displaced by the amino groups of the amphoteric polyelectrolyte coating polymer, and said reactive groups are selected from fluoride, chloride, bromide, iodide, quaternary ammonium, pyridinium and sulfonium.

37. A process according to claim 32, wherein the curing is carried out at pH between about 8.5 and about 10.

38. A process according to claim 1, wherein said semipermeable membranes are characterized by having a sucrose rejection of greater than 90% at 70° C. after 3000 hours of use at 70° C. in the presence of 2% caustic containing 5% sucrose at a pressure of 15 atm and a flow rate of between about 10 and 15 liters/min.

39. A process according to claim 1, wherein, prior to step (d), steps (a)–(c) are repeated at least once, whereby to give multiple crosslinked layers.

40. A process according to claim 1, wherein step (c) comprises contacting said first layer of coating with a solution of an external crosslinking compound that is a polyfunctional compound for a time sufficient to ensure diffusion of said external crosslinking compound into the bulk of said first layer of coating, whereby to enable crosslinking within said first layer of coating by said external crosslinking compound not only at the surface of said first layer of coating where said first layer of coating contacts said solution of external external crosslinking compound but throughout the bulk of said first layer of coating as well.

* * * * *